UNITED STATES PATENT OFFICE.

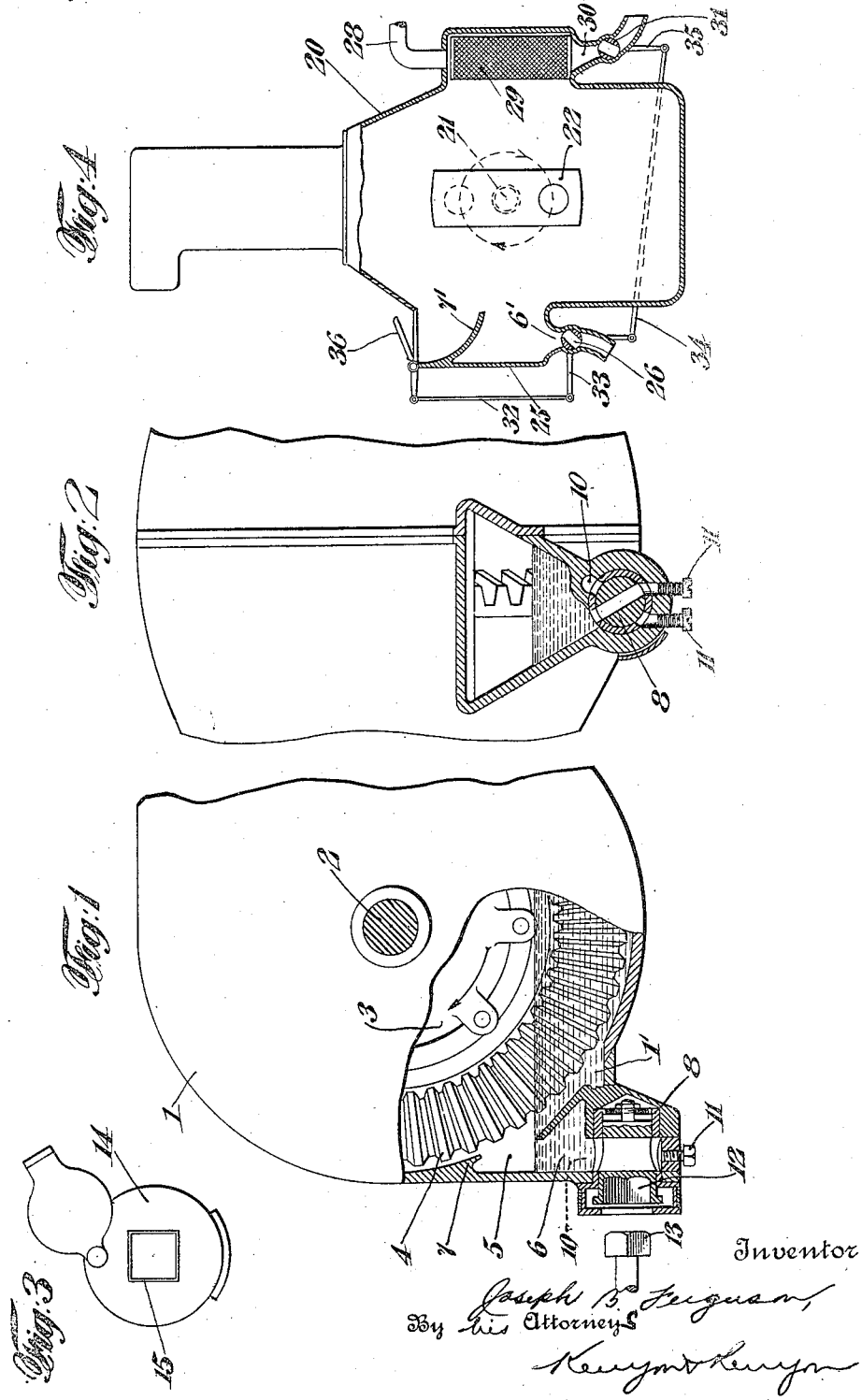

JOSEPH B. FERGUSON, OF NEW YORK, N. Y.

LUBRICANT-CIRCULATION SYSTEM.

1,241,103.

Specification of Letters Patent.

Patented Sept. 25, 1917.

Application filed October 19, 1916. Serial No. 126,527.

*To all whom it may concern:*

Be it known that I, JOSEPH B. FERGUSON, a subject of the King of Great Britain, and a resident of New York city, county and State of New York, have invented certain new and useful Improvements in Lubricant-Circulation Systems, of which the following is a specification.

This invention relates to a lubricant circulation system, and particularly to systems in which there may be included a gear case, crank chamber, axle housing, or the like, in which the lubricant is in motion.

Such casings usually contain oil, and in this oil sediment, wear particles, metallic chips from the gear teeth, bearings, etc., frequently collect, and their presence is detrimental to the usefulness of the oil. Even though such casings may be made sufficiently deep to allow for the collection of this sediment in the bottom, the only method of removing it is to draw off all of the oil. In order to avoid this waste, it is my purpose to provide means for collecting such undesirable particles in a small chamber through which the oil flows, so that, by emptying the small chamber, they may be discharged without loss of the entire body of oil.

An object of this invention is to provide means for separating from lubricant sediment, chips or other wear particles coming from the parts over which the lubricant flows.

In the attainment of this object, it is my further object to provide a sediment trap for collecting undesirable particles from flowing oil.

It is a further object to provide means for drawing off dirty oil without employing any trap beneath the bottom of the case and without necessitating the provision of more than a working clearance between the moving parts and the bottom of the case.

According to this invention, a chamber is formed, into and out of which oil flows, and it is provided that, while the oil is within it, undesirable particles may settle to the bottom thereof and be withdrawn as desired. In order that the oil may be caused to flow across this chamber, the chamber may be positioned where oil will flow to it which has been thrown up by moving parts. Hence, a draining of such chamber while the parts are inoperative will entail the loss only of whatever oil remains in the chamber.

Other and further objects and advantages of this invention will appear from the accompanying description, taken in connection with the drawings forming a part of this specification, and will be pointed out in the hereunto appended claims.

In the drawings, in which like reference characters indicate similar parts,

Figure 1 is a partial cross-section, with parts broken away, of a housing for a rear axle of a motor vehicle embodying my invention;

Fig. 2 is a partial cross-section of the device shown in Fig. 1;

Fig. 3 is a detail view;

Fig. 4 is a diagrammatic cross-section of an engine having a crank casing embodying my invention.

While this description refers to particular embodiments of my device, the details shown and described are referred to merely for the purpose of interpreting my invention, and it is to be understood that it is of broad application and is only defined by the hereunto appended claims.

In Fig. 1, the housing 1 contains the axle 2, upon which is the housing 3 for differential gearing, and upon this is mounted the axle driving gear 4. The axle housing is formed so that there is just sufficient clearance for the gear, and the maximum road clearance is thereby provided for. It is intended that the gear 4 will rotate in the direction of the arrow, and the lubricant contained in the casing will, therefore, be thrown up upon the wall of the housing. An opening 5 is provided in this wall, which leads into a chamber or trap 6. Overhanging portion 7 prevents the oil from flowing upward by reason of its inertia or by reason of any drag of the wheel, and the oil, therefore, flows downward into the chamber or trap 6. This trap fills up and overflows, but all of the oil flowing down the wall flows into it and out of it. However, while the oil is in it, the sediment and wear particles will fall to the bottom thereof, and, by reason of their specific gravity being higher than that of the oil, they will be trapped therein. In this case the wall of the housing provides a part of the circulation system, and the chamber 6 forms a trap therein, into which undesirable particles settle. In order to drain the sediment from this trap, a two-way cock 8 is provided. When this cock is in the position shown in Fig. 2, the chamber 6 will be drained. If it is turned clockwise to register with the opening 10, the level of lubricant in the housing can be tested, for the passage 10 communicates with the lower part 1' of the housing. Plugs 11 may be used to close these passages, and the two-way cock may be left in any position; or the portion forming the cock 8 may be made integral and two passages may be provided, which are closed by plugs 11. The cock or valve plug 8 may be provided with a square key socket 12, into which a key 13 is adapted to fit. A covering 14 is provided for the valve or cock 8, and an opening 15 therein, of the same shape as the opening 12, registers with the opening 12, so that the key 13 may only be inserted or removed when the cock is in closed position.

My invention may be embodied in an engine having a crank casing 20 and crank shaft 21, in which are cranks 22, which rotate in the direction of the arrow and throw oil toward the wall 25. Projection 7', similar to the projection 7, prevents oil from flowing upward on this side, and the chamber 6', similar to the chamber 6, is positioned so that oil flowing downward on the wall 25 flows across it and sediment is caught in this chamber and discharged therefrom upon opening of the valve 26.

My invention is also embodied in the means provided for filtering oil into the casing 20. An oil pipe 28 leads from any point where oil accumulates to the casing, and particles are removed from the oil by the filter 29. These particles settle in the chamber 30 and are discharged therefrom by the opening of the valve 31. The valves 26 and 31 are opened by means of the link 32, the bell crank 33, the link 34, and the crank 35, whenever the cover 36 is raised for the purpose of pouring fresh oil into the crank casing. The part 7' also prevents fresh oil from flowing into the sediment chamber 6'.

While I have described specific features of structures embodying my invention, I do not intend that it shall be limited to these particular features, but intend that it shall be defined by the hereunto appended claims.

What I claim and desire to secure by Letters Patent of the United States is the following:—

1. A mechanism container, mechanism therein comprising parts engaging in their normal operation to form sediment and chips, said mechanism being arranged to throw the lubricant which lubricates said engaging parts against the side wall of said container and a drainable sediment trap formed in said side and arranged to receive said lubricant thrown by said mechanism, and flowing down said side of said container and collect the sediment and chips settling therein, said trap having an opening, the lower side of which is substantially at or above the normal level of the lubricant of said container, the purified oil overflowing into said container as additional oil is received by said trap.

2. A mechanism container adapted to contain lubricant, mechanism in said container whereby lubricant is thrown against the side of said container, means to retard upward flow of lubricant on said side, and a sediment trap below said means, said means also acting to deflect lubricant back into said trap.

3. In combination, an axle, a gear for driving said axle and mounted thereon, a lubricant-containing housing mounted on said axle and surrounding said gear, there being only a working clearance between said gear and housing and a drainable sediment trap formed in the side of said housing toward which the lower side of said gear rotates and substantially in the plane thereof, said trap having an opening arranged to catch lubricant thrown up by said gear against said side of said housing, the lower edge of said opening being substantially at or above the normal level of the lubricant in said housing, said trap being arranged to overflow into said housing, whereby a maximum of road clearance of said housing is obtained and sediment is removed from the lubricant.

4. A mechanism container, mechanism therein comprising parts engaging in their normal operation to form sediment and chips, said container having a side wall, a sediment trap carried by said side wall, said mechanism being arranged to throw lubricant which lubricates said engaging parts toward said trap, said trap being drainable and being arranged to receive said lubricant and to collect the sediment and chips settling therein, said trap having an opening, the lower side of which is substantially at or above the normal level of the lubricant in said container and arranged so that the purified oil overflows into said container as additional oil is received by said trap.

In testimony whereof, I have signed my name to this specification.

JOSEPH B. FERGUSON.

Copies of this patent may be obtained for five cents each, by addressing the "Commissioner of Patents, Washington, D. C."